United States Patent
Tabata et al.

(10) Patent No.: US 12,080,288 B2
(45) Date of Patent: Sep. 3, 2024

(54) LEARNING SUPPORT DEVICE, LEARNING SUPPORT METHOD, AND RECORDING MEDIUM

(71) Applicant: NEC Corporation, Tokyo (JP)

(72) Inventors: Futoshi Tabata, Tokyo (JP); Ryuunosuke Mutou, Tokyo (JP); Satoshi Shimada, Tokyo (JP); Toshiyuki Kataoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 423 days.

(21) Appl. No.: 17/298,714

(22) PCT Filed: Nov. 27, 2019

(86) PCT No.: PCT/JP2019/046367
§ 371 (c)(1),
(2) Date: Jun. 1, 2021

(87) PCT Pub. No.: WO2020/116280
PCT Pub. Date: Jun. 11, 2020

(65) Prior Publication Data
US 2022/0051670 A1    Feb. 17, 2022

(30) Foreign Application Priority Data
Dec. 4, 2018 (JP) ................................. 2018-227694

(51) Int. Cl.
*G10L 15/16* (2006.01)
*G09B 5/04* (2006.01)
(Continued)

(52) U.S. Cl.
CPC ............... *G10L 15/22* (2013.01); *G09B 5/04* (2013.01); *G10L 15/10* (2013.01); *G10L 15/20* (2013.01); *G10L 2015/227* (2013.01)

(58) Field of Classification Search
None
See application file for complete search history.

(56) References Cited

U.S. PATENT DOCUMENTS

| 8,494,149 B2 * | 7/2013 | Watanabe ......... H04M 3/42221 379/88.01 |
| 10,896,428 B1 * | 1/2021 | Balasubramaniam ...................... G10L 15/1815 |

(Continued)

FOREIGN PATENT DOCUMENTS

| JP | H11136369 A | 5/1999 |
| JP | 2001159865 A | 6/2001 |

(Continued)

OTHER PUBLICATIONS

International Search Report of PCT Application No. PCT/JP2019/046367 mailed Mar. 3, 2020.

(Continued)

*Primary Examiner* — Seong-Ah A Shin

(57) ABSTRACT

A learning support device acquires sound data; extracts a letter string representing content of an utterance for each utterance by a learner included in the sound data; identify, for each utterance, a learner who has made the utterance from among a plurality of learners based on the sound data; identify emotion information representing an emotion of the learner in the utterance, based on at least one of the sound data and data of a moving image captured together with the sound data; and outputs, for each group to which learner belongs, the plurality of pieces of emotion information in time series order with being associated with the plurality of letter strings.

8 Claims, 10 Drawing Sheets

(51) Int. Cl.
*G10L 15/10* (2006.01)
*G10L 15/20* (2006.01)
*G10L 15/22* (2006.01)

(56) References Cited

U.S. PATENT DOCUMENTS

| | | | | |
|---|---|---|---|---|
| 2001/0002831 | A1* | 6/2001 | Kato | G06F 3/04815 |
| | | | | 715/700 |
| 2003/0028378 | A1 | 2/2003 | August et al. | |
| 2009/0204398 | A1* | 8/2009 | Du | G09B 5/04 |
| | | | | 704/E15.001 |
| 2011/0283008 | A1* | 11/2011 | Smelyansky | H04N 7/15 |
| | | | | 715/753 |
| 2013/0124240 | A1* | 5/2013 | Varadarajan | G06Q 50/20 |
| | | | | 705/7.11 |
| 2014/0172426 | A1* | 6/2014 | Aratsu | G10L 21/0208 |
| | | | | 704/235 |
| 2014/0244264 | A1* | 8/2014 | Thirumalainambi | G10L 25/63 |
| | | | | 704/270 |
| 2016/0104385 | A1* | 4/2016 | Alam | G09B 5/00 |
| | | | | 434/236 |
| 2016/0379643 | A1* | 12/2016 | Ito | G10L 15/1822 |
| | | | | 704/270.1 |
| 2017/0337034 | A1* | 11/2017 | Taki | G06F 3/165 |
| 2019/0108834 | A1* | 4/2019 | Nelson | G06N 5/04 |
| 2020/0126545 | A1* | 4/2020 | Kakkar | G06V 10/764 |
| 2020/0192981 | A1* | 6/2020 | Fox | G06F 40/30 |
| 2020/0312332 | A1* | 10/2020 | Nishikawa | G06F 40/58 |
| 2021/0151058 | A1* | 5/2021 | Cheung | G10L 17/00 |
| 2021/0193168 | A1 | 6/2021 | Taki et al. | |
| 2021/0210086 | A1* | 7/2021 | Han | G10L 15/22 |
| 2021/0233550 | A1* | 7/2021 | Aihara | G10L 15/16 |
| 2021/0407514 | A1* | 12/2021 | Laird | G06F 40/30 |
| 2023/0147985 | A1* | 5/2023 | Totsuka | G06N 3/045 |
| | | | | 706/12 |

FOREIGN PATENT DOCUMENTS

| | | |
|---|---|---|
| JP | 2006106711 A | 4/2006 |
| JP | 2006277567 A | 10/2006 |
| JP | 2010-211594 A | 9/2010 |
| JP | 2013115622 A | 6/2013 |
| JP | 2016062550 A | 4/2016 |
| JP | 2016162339 A | 9/2016 |
| JP | 2017027536 A | 2/2017 |
| JP | 2017167308 A | 9/2017 |
| JP | 2018147279 A | 9/2018 |
| WO | 2014097748 A1 | 6/2014 |
| WO | 2017061149 A1 | 4/2017 |
| WO | 2017179262 A1 | 10/2017 |

OTHER PUBLICATIONS

JP Office Action for JP Application No. 2018-227694, mailed on Jan. 31, 2023 with English Translation.

* cited by examiner

| USER ID | USER NAME | SOUND FEATURE AMOUNT | BELONGING GROUP |
|---|---|---|---|
| 000 | Alice | | COACH |
| 001 | Bob | | GROUP A |
| 002 | Carol | | GROUP B |
| 003 | Dave | | GROUP C |
| ⋮ | ⋮ | ⋮ | ⋮ |

LEARNING SUPPORT DEVICE, LEARNING SUPPORT METHOD, AND RECORDING MEDIUM

This application is a National Stage Entry of PCT/JP2019/046367 filed on Nov. 27, 2019, which claims priority from Japanese Patent application 2018-227694 filed on Dec. 4, 2018, the contents of all of which are incorporated herein by reference, in their entirety.

TECHNICAL FIELD

The present invention relates to a learning support device, a learning support method, and a recording medium.

BACKGROUND ART

As one of learning forms, collaborative learning in which a plurality of learners exchange opinions and learn from each other is known. Patent Document 1 discloses technology for estimating thinking processes of a plurality of learners in collaborative learning. According to the technology described in Patent Document 1, keywords representing "confidence," "question," and the like are extracted from a time-series utterance sentence of a user and a degree of rumination of thinking in collaborative learning is measured on the basis of the keywords.

PRIOR ART DOCUMENTS

Patent Documents

[Patent Document 1]
Japanese Unexamined Patent Application, First Publication No. 2018-147279

SUMMARY OF THE INVENTION

Problem to be Solved by the Invention

In collaborative learning, when a coach evaluates a learner, the activity of exchanging opinions is important in addition to content of an utterance. For example, an utterance that triggers the activation of an exchange of opinions is useful for the evaluation of the learner. Thus, in collaborative learning, technology for allowing a coach to recognize the activity of exchanging opinions in a group is desired.

An example object of the present invention is to provide a learning support device, a learning support method, and a recording medium for solving the above-described problems.

Means for Solving the Problem

According to a first aspect of the present invention, a learning support device includes: a sound acquisition means for acquiring sound data; a letter string extraction means for extracting a letter string representing content of an utterance for each utterance by a learner included in the sound data; a learner identification means for identifying, for each utterance, a learner who has made the utterance from among a plurality of learners based on the sound data; an emotion identification means for identifying emotion information representing an emotion of the learner in the utterance, based on at least one of the sound data and data of a moving image captured together with the sound data; and an output means for outputting, for each group to which learner belongs, the plurality of pieces of emotion information in time series order with being associated with the plurality of letter strings.

According to a second example embodiment of the present invention, a learning support method includes: acquiring sound data; extracting a letter string representing content of an utterance for each utterance by a learner included in the sound data; identifying, for each utterance, a learner who has made the utterance from among a plurality of learners based on the sound data; identifying emotion information representing an emotion of the learner in the utterance, based on at least one of the sound data and data of a moving image captured together with the sound data; and outputting, for each group to which learner belongs, the plurality of pieces of emotion information in time series order with being associated with the plurality of letter strings.

According to a third example embodiment of the present invention, a recording medium storing a program for causing a computer to execute: acquiring sound data; extracting a letter string representing content of an utterance for each utterance by a learner included in the sound data; identifying, for each utterance, a learner who has made the utterance from among a plurality of learners based on the sound data; identifying emotion information representing an emotion of the learner in the utterance, based on at least one of the sound data and data of a moving image captured together with the sound data; and outputting, for each group to which learner belongs, the plurality of pieces of emotion information in time series order with being associated with the plurality of letter strings.

Effect of Invention

According to at least one of the above aspects, a learning support device outputs a time series of emotion information representing transitions in emotions of learners belonging to a group in association with a letter string representing content of an utterance. Because the activity of exchanging opinions can affect a transition in the emotion of the learner, the coach can evaluate the learner or the utterance of the learner in view of the activity of exchanging opinions.

EXAMPLE EMBODIMENT

First Example Embodiment

Hereinafter, example embodiments will be described in detail with reference to the drawings.

Figure 1:
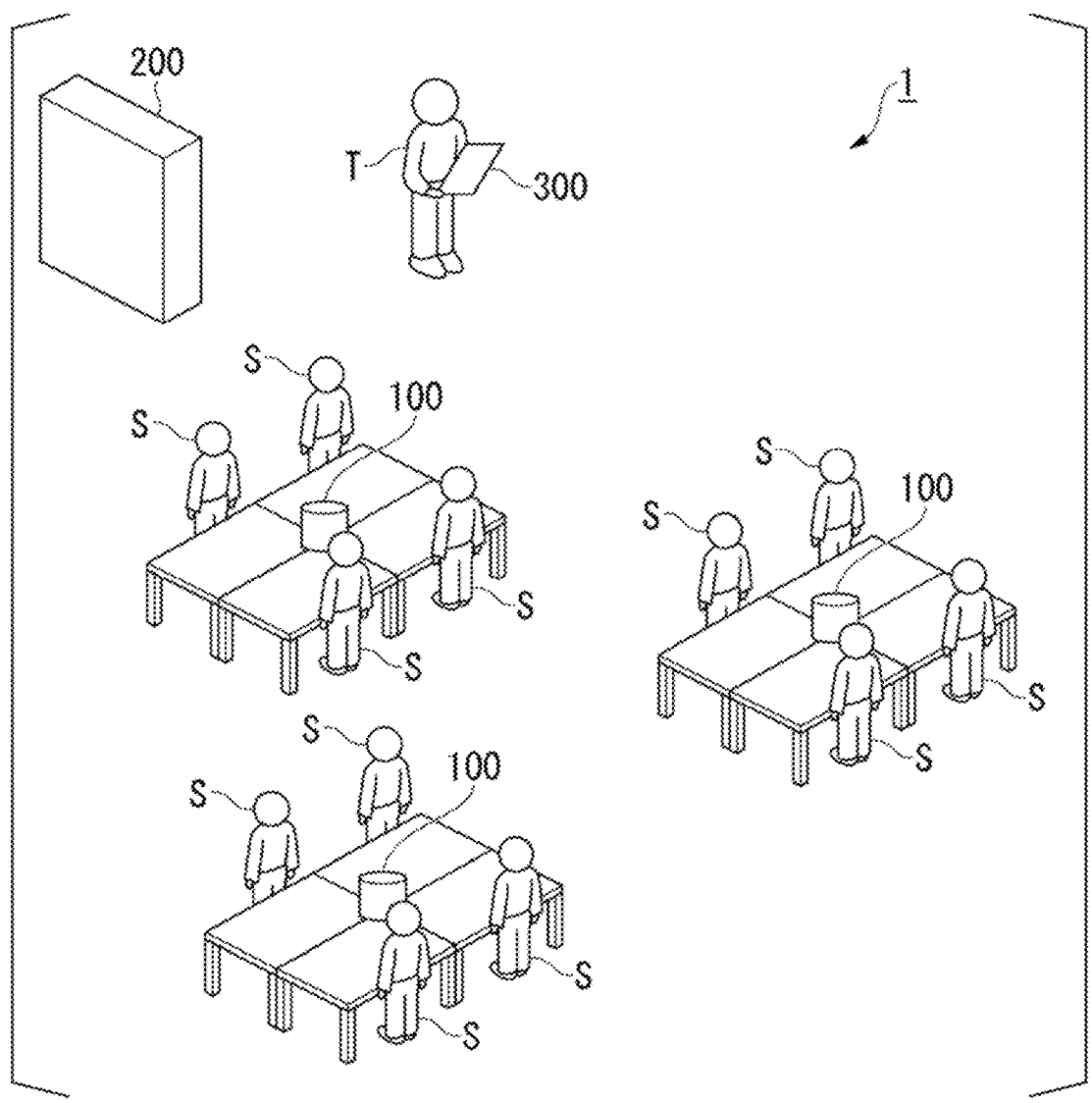
FIG. 1 is a schematic diagram showing a configuration of a learning support system according to a first example embodiment.

FIG. 1 is a schematic diagram showing a configuration of a learning support system 1 according to a first example embodiment.

The learning support system 1 is a system that provides a coach T with information for evaluation of a plurality of learners S in collaborative learning. In collaborative learning, a plurality of learners S are divided into a plurality of groups and a plurality of learners S exchange opinions in each group.

The learning support system 1 includes a collection device 100, a learning support device 200, and a coach terminal 300.

The collection device 100 includes a microphone that records utterances of a plurality of learners S. Also, the collection device 100 may include an imaging device that captures a moving image in which the plurality of learners S are shown in addition to the microphone.

The learning support system 1 includes a plurality of collection devices 100. In the learning support system 1, as shown in FIG. 1, the collection device 100 may be provided in each table surrounded by a plurality of learners constituting a group. Also, in another example embodiment, a single collection device 100 may be provided at a position such as a ceiling where sound and moving images of all the learners S can be collected. Sound data and moving image data collected by the collection device 100 are transmitted to the learning support device 200 by wireless communication or wired communication.

The learning support device 200 generates display information used for evaluation of a plurality of learners S on the basis of the sound data and the moving image data received from the collection device 100 and transmits the display information to the coach terminal 300.

The coach terminal 300 is a terminal visually recognized by the coach T. The coach terminal 300 may be, for example, a tablet terminal. The coach terminal 300 displays the display information transmitted from the learning support device 200. The coach T can use the display information displayed on the coach terminal 300 for the evaluation of the plurality of learners S. In another example embodiment, the coach terminal 300 may be provided so that the learner S can also refer to it. For example, the coach terminal 300 may be a wall-mounted display device.

Figures 2, 3:
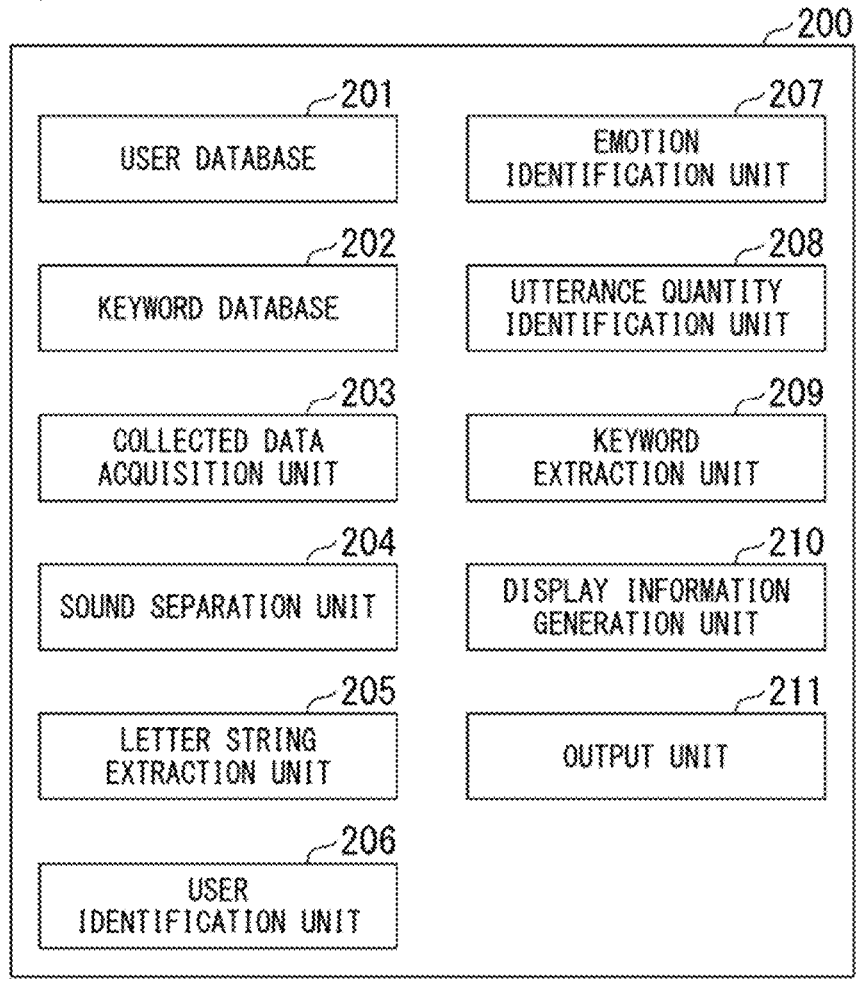
FIG. 2 is a schematic block diagram showing a configuration of a learning support device according to the first example embodiment.
FIG. 3 is a diagram showing an example of a user database according to the first example embodiment.

FIG. 2 is a schematic block diagram showing a configuration of the learning support device 200 according to the first example embodiment.

The learning support device 200 includes a user database 201, a keyword database 202, a collected data acquisition unit (a collected data acquisition means) 203, a sound separation unit (a sound separation means) 204, a letter string extraction unit (a letter string extraction means) 205, a user identification unit (a user identification means) 206, an emotion identification unit (an emotion identification means) 207, an utterance quantity identification unit (an utterance quantity identification means) 208, a keyword extraction unit (a keyword extraction means) 209, a display information generation unit (a display information generation means) 210, and an output unit (an output means) 211.

FIG. 3 is a diagram showing an example of the user database 201 according to the first example embodiment.

The user database 201 stores a user ID (an identifier), a user name, a speech feature amount, and a belonging group for each user (each learner S and each coach T) with being associated with each other. The speech feature amount is information used for identifying a user (recognizing a speaker) from sound data. The speech feature amount is generated, for example, by acquiring the sound data of the user in advance. The speech feature amount may be data obtained by analyzing a frequency of sound data or may be a speaker model. The belonging group is information representing an ID of the group to which the user belongs or information representing that the user is the coach T.

The keyword database 202 stores keywords that should be watched in collaborative learning by the coach T. Specific examples of the keywords may include words that are key points of discussion, words that are points of evaluation, and the like.

The collected data acquisition unit 203 acquires sound data from the collection device 100. The collected data acquisition unit 203 is an example of a sound acquisition unit.

The collected data acquisition unit 203 may acquire moving image data from the collection device 100 if possible.

The sound separation unit 204 separates the sound data acquired by the collected data acquisition unit 203 by each utterance. One utterance may be, for example, a series of pieces of speech from one user. For example, the sound separation unit 204 separates sound data by user by extracting a component having each sound feature amount from the sound data on the basis of sound feature amount of users stored in the user database 201. Thereby, the learning support device 200 can recognize each utterance separately even if a plurality of utterances overlap in the sound data. Further, the sound separation unit 204 separates the sound data that has been separated by each user, using a silence section of a certain period of time or longer as a boundary. In the present example embodiment, the "silence section" does not necessarily have to have a volume of zero. The "silence section" may be a section in which there is no utterance by the user or a section in which the volume is equal to or lower than a predetermined level. Thereby, the sound separation unit 204 can separate the sound data by utterance. Hereinafter, the sound data separated by the sound separation unit 204 will be referred to as utterance sound data. The utterance sound data separated by the sound separation unit 204 is associated with a start time of the utterance.

The letter string extraction unit 205 converts the utterance sound data separated by the sound separation unit 204 into a letter string through a sound recognition process. The letter string extraction unit 205 may extract letter string data from the utterance sound data by applying, for example, a hidden Markov model.

The user identification unit 206 identifies the user who has made the utterance on the basis of the utterance sound data separated by the sound separation unit 204. For example, the user identification unit 206 may identify the user by collating the utterance sound data separated by the sound separation unit 204 with a sound feature amount of the user stored in the user database 201. Also, for example, the user identification unit 206 may identify, for each of the pieces of utterance sound data separated from each other by the sound separation unit 204, the user by identifying a sound feature amount that has been used by the sound separation unit 204 for separating the utterance sound data. The user identification unit 206 is an example of a learner identification unit (a learner identification means) and a coach identification unit (a coach identification means).

The emotion identification unit 207 generates emotion information representing the emotion of the user who has made the utterance on the basis of the utterance sound data separated by the sound separation unit 204. The emotion information is represented by values of a plurality of emotion components such as calm, anger, joy, and sadness. For example, the emotion information is represented by four emotion components including calm, anger, joy, and sadness. Each emotion component may be represented by a value in 10 steps from 0 to 9. The emotion identification unit 207 identifies an emotion based on the strength, pitch, speed, and intonation of a sound on the basis of the utterance sound data. For example, the emotion identification unit 207 may use a learned model created by machine learning using utterance sound data in which emotion information representing the emotion of the user who has made the utterance is known.

Here, the emotion identification unit 207 may identify the user's emotion on the basis of the moving image data. For example, the emotion identification unit 207 may identify the emotion by analyzing a facial expression and a gesture of the user at the start time of the utterance associated with the utterance sound data within the moving image data. In this case, the emotion identification unit 207 may use a learned model created by machine learning using moving image data in which emotion information is known.

The utterance quantity identification unit 208 identifies an utterance quantity of the user for each unit time on the basis of the letter string extracted by the letter string extraction unit 205. For example, the utterance quantity identification unit 208 identifies the utterance quantity of the user on the basis of the amount of letters included in the letter string extracted by the letter string extraction unit 205. Here, the utterance quantity identification unit 208 in another example embodiment may identify the utterance quantity on the basis of an utterance time period in the utterance sound data.

The keyword extraction unit 209 extracts a letter string including a keyword recorded in the keyword database 202 from among a plurality of letter strings extracted by the letter string extraction unit 205.

The display information generation unit 210 generates display information for use in evaluating a plurality of learners S on the basis of a letter string of each utterance extracted by the letter string extraction unit 205, the user of each utterance identified by the user identification unit 206, the emotion information associated with each utterance generated by the emotion identification unit 207, and the utterance quantity identified by the utterance quantity identification unit 208.

Specifically, the display information generation unit 210 generates, as the display information, an utterance timeline in which utterance information representing utterances by a plurality of learners is arranged in time-series order for each group, a discussion transition graph showing a transition of the utterance quantity in one entire group, and an utterance transition graph showing transition of the utterance quantity and the emotion for each learner belonging to one group. Details of the display information will be described below.

The output unit 211 transmits the display information generated by the display information generation unit 210 to the coach terminal 300. Thereby, the coach terminal 300 can display the display information. The coach terminal 300 may simultaneously display the utterance timeline, the discussion transition graph, and the utterance transition graph on a single screen or may selectively display any display information designated by the coach T.

The display information generated by the display information generation unit 210 will be described.

Figure 4:
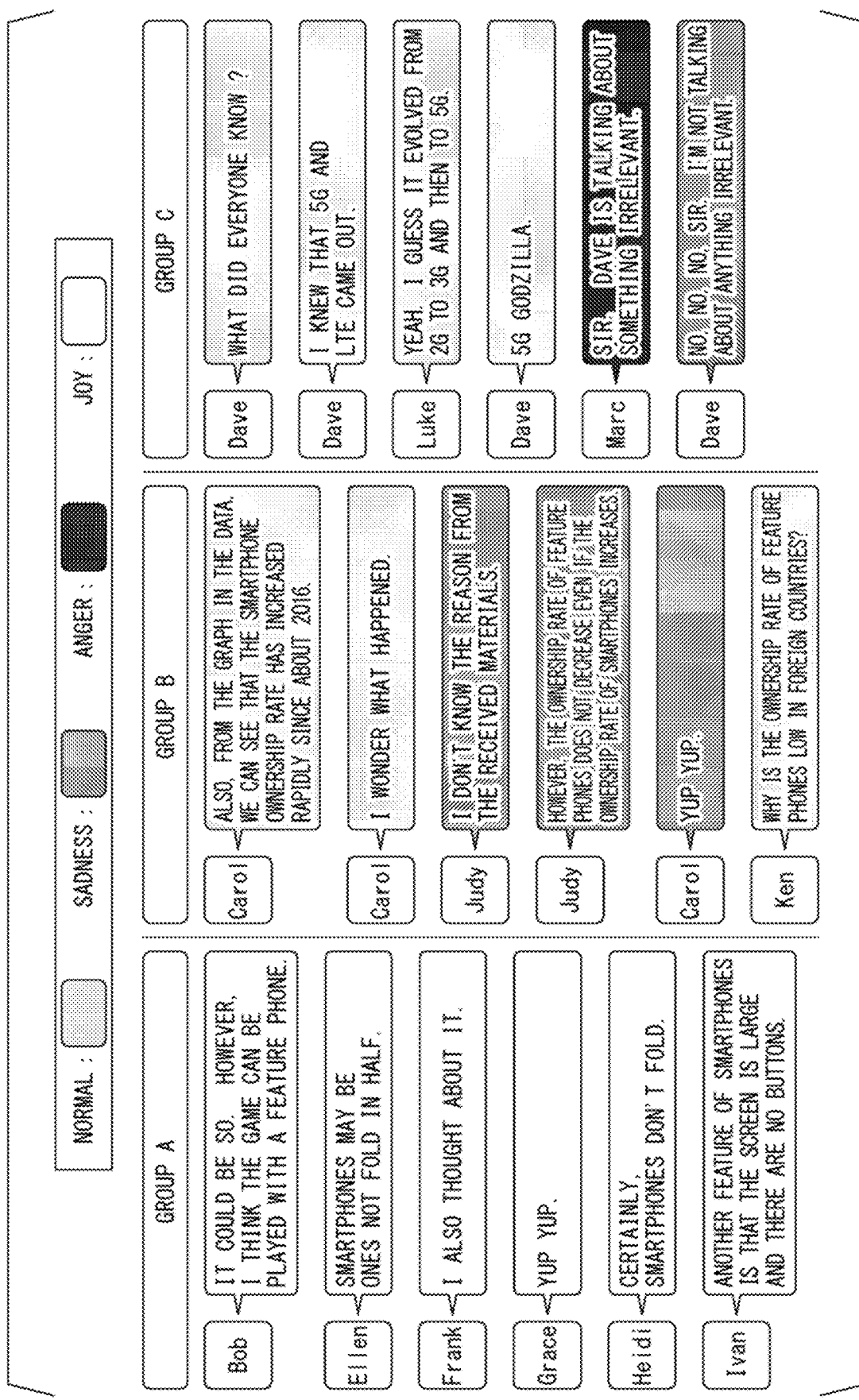
FIG. 4 is a diagram showing an example of an utterance timeline according to the first example embodiment.

An example of the display information generated by the display information generation unit 210 is the utterance timeline. FIG. 4 is a diagram showing an example of the utterance timeline according to the first example embodiment.

The utterance timeline includes a plurality of frames for classifying the group. Within each frame, utterance information representing content of the utterance by each learner S belonging to the group is displayed vertically arranged in time-series order. The utterance information includes an icon for identifying the learner S and a balloon for accommodating a letter string representing content of the utterance. The balloon is displayed in a color corresponding to the emotion of the learner S. For example, when the emotion component of anger is dominant in the emotion information associated with the utterance, the balloon is displayed in red. Also, for example, when the emotion component of sadness is dominant in the emotion information associated with the utterance, the balloon is displayed in blue. That is, the utterance timeline is display information in which a plurality of pieces of emotion information are arranged in time-series order with being associated with a plurality of letter strings, for each group. Also, the balloon is highlighted and displayed when the utterance contains a specific keyword. By visually recognizing the utterance timeline, the coach T can recognize the utterance of the learner S that has been missed and can recognize the emotion of the learner S at the time of the utterance.

Figure 5:
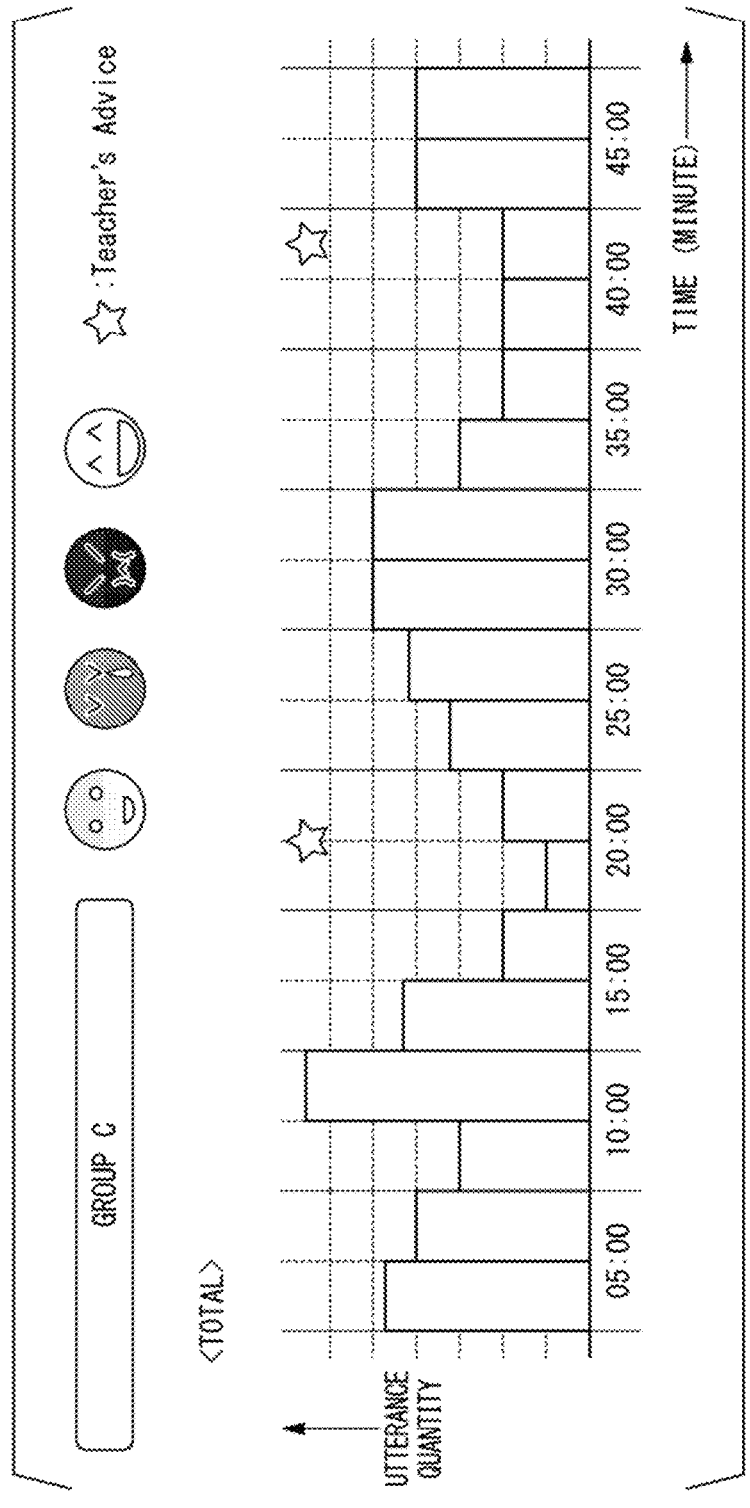
FIG. 5 is a diagram showing an example of a discussion transition graph according to the first example embodiment.

Another example of the display information generated by the display information generation unit 210 is a discussion transition graph. FIG. 5 is a diagram showing an example of a discussion transition graph according to the first example embodiment.

The discussion transition graph is a graph in which the vertical axis represents an utterance quantity and the horizontal axis represents time. The discussion transition graph is a graph in which a total utterance quantity in one group within a unit time is plotted for each unit time. By visually recognizing the discussion transition graph, the coach T can recognize a transition of the activity of the discussion for each group. The letter string extracted by the letter string extraction unit 205 is associated with the horizontal axis of the discussion transition graph. For example, when any point in the discussion transition graph is tapped, the coach terminal 300 can display the utterance information at a time point corresponding to the tapped point. Thereby, the coach T can recognize the utterance of the learner S leading to the activation of the discussion with reference to the speech information at the timing when the discussion starts to be activated.

Also, the discussion transition graph is marked with the timing at which the utterance has been made by the coach T. Thereby, it is possible to visually recognize the change in the activity of the discussion after the utterance (for example, problem presentation) by the coach T and it is possible to recognize whether or not the utterance by the coach T has been appropriate. Also, for example, the coach terminal 300 can display the utterance information of the coach T at that timing by selecting the mark. Thereby, the coach T can look back on the content of the utterance and whether or not the utterance method has been appropriate.

Figure 6:
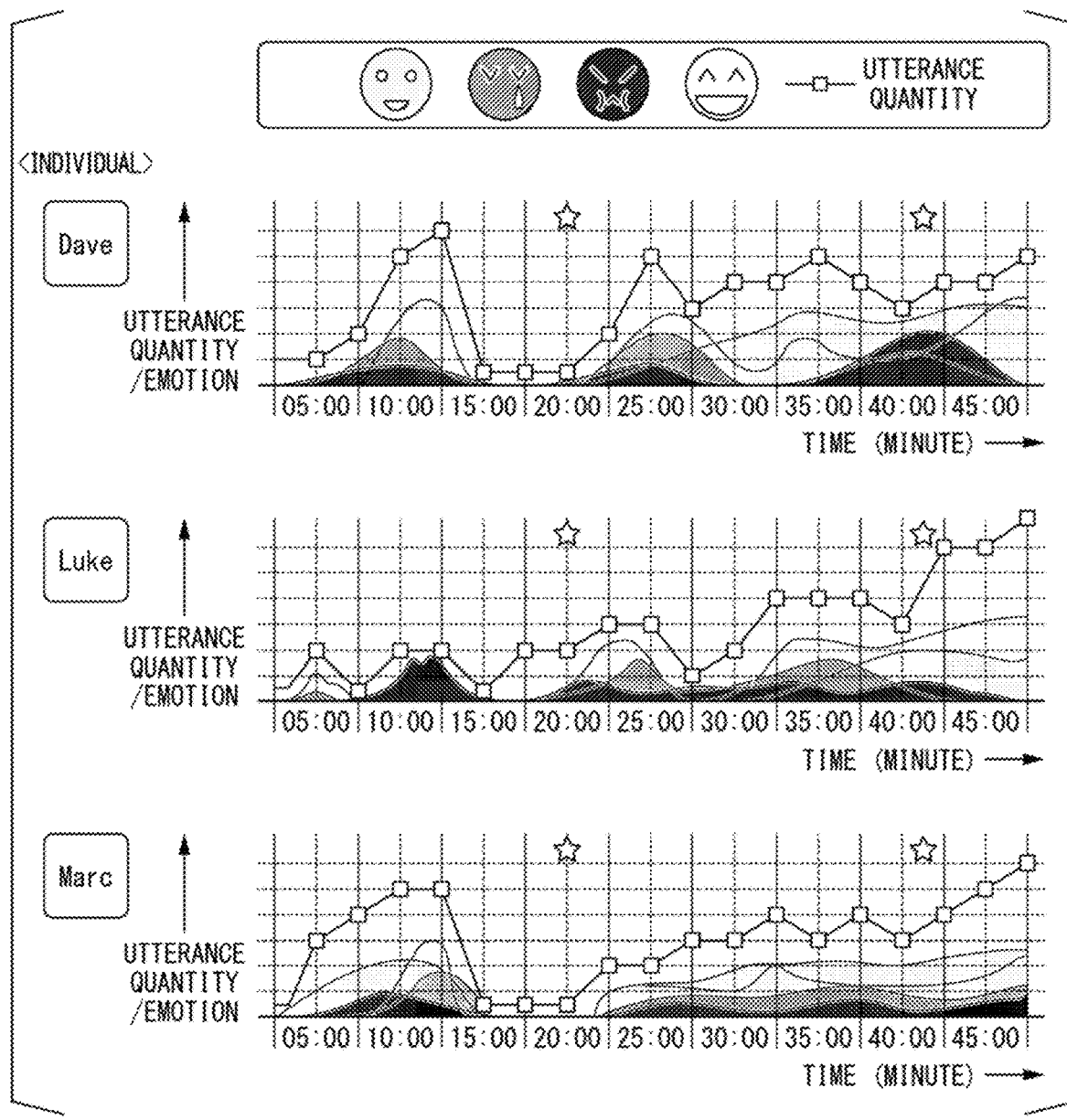
FIG. 6 is a diagram showing an example of an utterance transition graph according to the first example embodiment.

Another example of the display information generated by the display information generation unit 210 is an utterance transition graph. FIG. 6 is a diagram showing an example of an utterance transition graph according to the first example embodiment.

In the utterance transition graph, the vertical axis represents an utterance quantity or a magnitude of the emotion component and the horizontal axis represents time. The utterance transition graph is generated for each learner S belonging to one group and shows an utterance quantity of the learner S and the transition of the utterance quantity and the emotion. Specifically, the utterance transition graph is a graph in which a total utterance quantity of the learner within the unit time and a magnitude of each emotion component are plotted for each unit time. The coach T can evaluate whether or not the learner S can appropriately express his/her opinion by visually recognizing the utterance transition graph.

The horizontal axis of the utterance transition graph is associated with the letter string extracted by the letter string extraction unit 205. For example, the coach terminal 300 can display, when any point on the utterance transition graph is tapped, utterance information at a time point corresponding to the tapped point. Thereby, the coach T can refer to the speech information at the timing when the emotion of the learner S has significantly changed and recognize the utterance of the learner S that has led a change in the emotion. That is, the utterance transition graph is display information in which a plurality of pieces of emotion information are arranged in time-series order with being associated with a plurality of letter strings, for each group.

Also, the utterance transition graph is marked at the timing when the utterance has been made by the coach T, as in the discussion transition graph.

Figure 7:
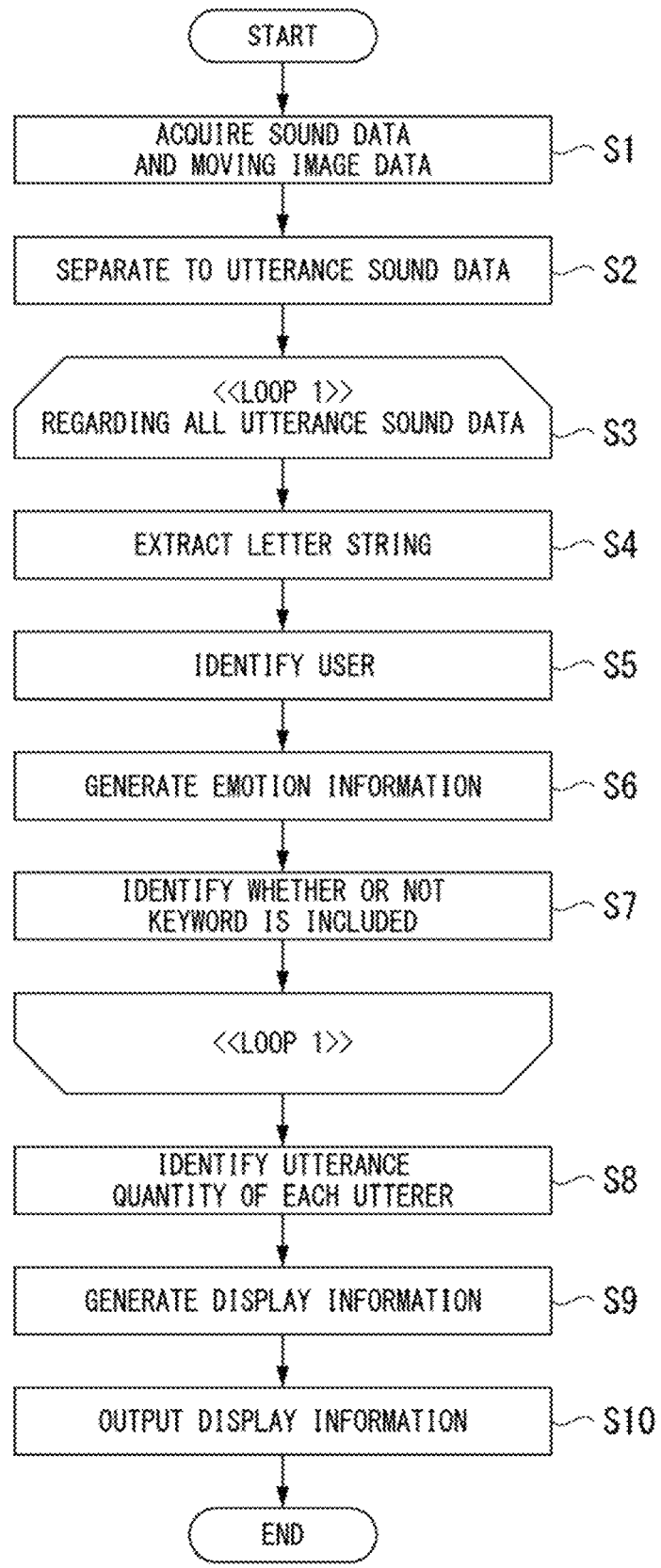
FIG. 7 is a flowchart showing an operation of the learning support device according to the first example embodiment.

FIG. 7 is a flowchart showing an operation of the learning support device 200 according to the first example embodiment.

When collaborative learning by a plurality of learners S starts, the learning support device 200 executes the following process for each predetermined unit time.

First, the collected data acquisition unit 203 acquires sound data and moving image data in the unit time from the collection device 100 (step S1). Next, the sound separation unit 204 separates sound data acquired by the collected data acquisition unit 203 by utterance and generates one or more pieces of utterance sound data (step S2).

The learning support device 200 selects the pieces of separated utterance sound data one by one and performs the following processing of steps S4 to S7 for all the utterance sound data (step S3).

The letter string extraction unit 205 extracts a letter string from the utterance sound data selected in step S3 through a sound recognition process (step S4). The user identification unit 206 identifies a user who has made the utterance on the basis of the utterance sound data selected in step S3 (step S5). The emotion identification unit 207 generates emotion information representing an emotion of the user who has made the utterance on the basis of the utterance sound data selected in step S3 (step S6). The keyword extraction unit 209 determines whether or not the letter string extracted in step S4 includes a keyword recorded in the keyword database 202 (step S7).

The utterance quantity identification unit 208 identifies an utterance quantity in the unit time for each learner S on the basis of a length of the letter string obtained through conversion in step S4 (step S8). The display information generation unit 210 generates the utterance timeline, the discussion transition graph, and the utterance transition graph on the basis of the letter string of each utterance extracted by the letter string extraction unit 205, the user of each utterance identified by the user identification unit 206, the emotion information associated with each utterance generated by the emotion identification unit 207, and the utterance quantity identified by the utterance quantity identification unit 208 (step S9). The output unit 211 transmits the utterance timeline, the discussion transition graph, and the utterance transition graph generated by the display information generation unit 210 to the coach terminal 300 (step S10).

As described above, according to the first example embodiment, the learning support device 200 identifies a letter string representing utterance content, a learner who has made the utterance, and emotion information from sound data for each utterance by the learner and arranges and outputs a plurality of pieces of emotion information in time-series order with being associated with a plurality of letter strings, for each group to which the learner belongs.

The activity of exchanging opinions is reflected in the change in the emotion associated with the utterance of the learner. Thus, the learning support device 200 can allow the coach to recognize the activity of exchanging opinions in the group according to the above configuration.

Also, according to the first example embodiment, the learning support device 200 outputs an utterance timeline in which utterance information including a letter string and emotion information is arranged in time-series order for each group. By visually recognizing the utterance timeline during the collaborative learning by the learner S, the coach T can recognize the utterance of the learner S that has been missed and can also recognize the emotion of the learner S at the time of the utterance. Thereby, the coach T can confirm and evaluate the utterance of each learner S without omission. Also, thereby, the coach T can effectively encourage the learner S during collaborative learning.

Also, according to the first example embodiment, the learning support device 200 outputs an utterance transition graph showing a change over time in the utterance quantity and the emotion information with being associated with a letter string, for each group. The coach T can evaluate whether or not each learner S can appropriately express his/her opinion by visually recognizing the utterance transition graph after the completion of the collaborative learning by the learner S. Also, because the utterance transition graph is associated with the letter string, the coach T can recognize the utterance of the learner S which has led the transition in the emotion by referring to the utterance information at a timing when the emotion of the learner S has significantly changed. Thereby, the coach T can easily identify a significant utterance of each learner S and can appropriately evaluate the learner S. Here, according to another example embodiment, a transition in the emotion information of a plurality of learners S belonging to one group may be displayed in the discussion transition graph. In this case, the learning support device 200 may calculate a sum of the emotion components of the learners S for each unit time and identify the emotion information of the group in the unit time. Also, according to another example embodiment, the learning support device 200 may output an utterance transition graph showing changes over time in the utterance quantity and the emotion information for each learner S instead of each group. In this case, the coach T can recognize a timing when the emotion of the learner S has significantly changed, speech information at the timing, a change in the emotion of the learner S, and an utterance associated therewith in more detail.

Also, according to the first example embodiment, the learning support device 200 identifies the utterance by the coach from a plurality of utterances and outputs a discussion transition graph and an utterance transition graph with a mark representing the timing of the utterance by the coach. Thereby, the coach T can visually recognize the change in the activity of the discussion after the utterance by the coach T and can recognize whether or not the utterance by the coach T has been appropriate. Also, by displaying the utterance information of the coach T on the coach terminal 300, the coach T can look back on the content of the utterance and whether or not the utterance method has been appropriate and promote the improvement of the lesson from the next time.

Second Example Embodiment

In the first example embodiment, the coach T evaluates a plurality of learners S with reference to display information. On the other hand, in the second example embodiment, the learning support device 200 performs quantitative evaluation of a plurality of learners S, and causes the coach terminal 300 to display evaluation results. Thereby, the coach T can evaluate the plurality of learners S with reference to the displayed evaluation results.

Figure 8:
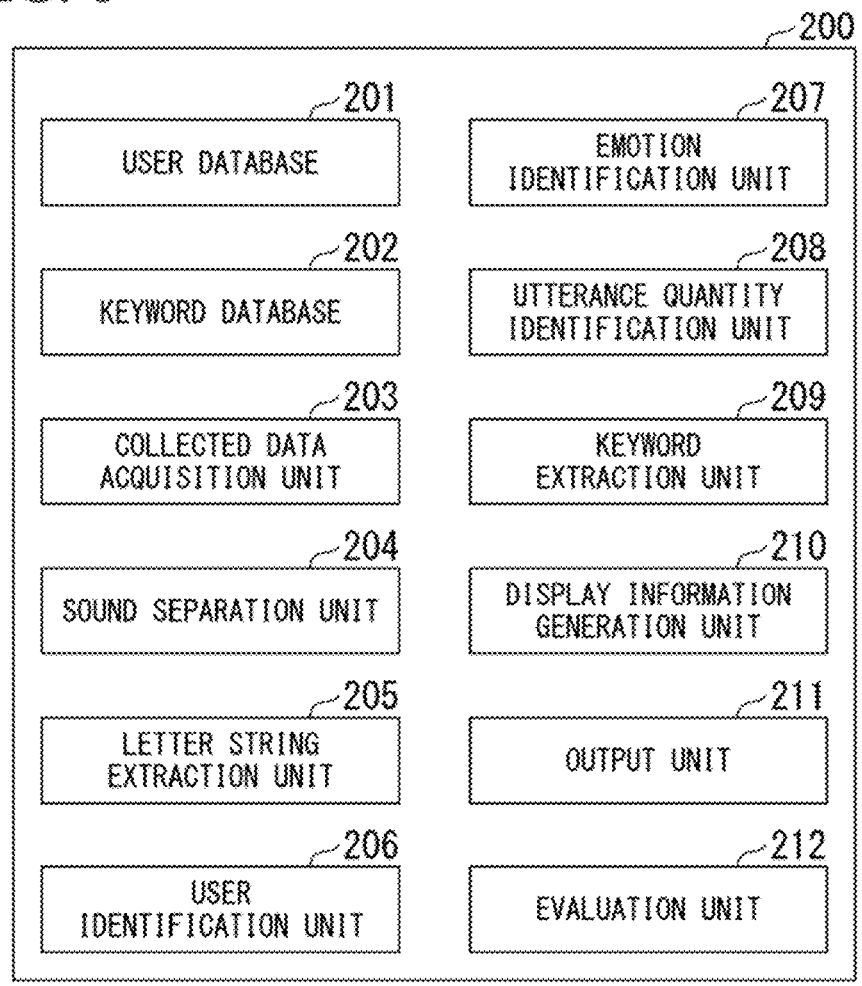
FIG. 8 is a schematic block diagram showing a configuration of a learning support device according to a second example embodiment.

FIG. 8 is a schematic block diagram showing a configuration of the learning support device 200 according to the second example embodiment.

The learning support device 200 according to the second example embodiment further includes an evaluation unit (an evaluation means) 212 in addition to the configuration of the first example embodiment.

The evaluation unit 212 generates evaluation information representing the evaluation for each learner S on the basis of a plurality of letter strings extracted by the letter string extraction unit 205 and a plurality of pieces of emotion information generated by the emotion identification unit 207. For example, the evaluation unit 212 calculates an evaluation value in accordance with a predetermined rubric on the basis of the letter string and the emotion information associated with the utterance of each learner S. Specific examples of evaluation items in the rubric may include a thinking ability, a determination ability, an expressive ability, and the like.

For example, the evaluation unit 212 calculates an evaluation value associated with the thinking ability in accordance with the amount of keywords representing a reason (for example, "because," "since," and the like) included in the letter string associated with the utterance. Also, for example, the evaluation unit 212 calculates an evaluation value associated with the determination ability in accordance with the amount of keywords representing a conclusion (for example, "Let's," "decision," and the like) included in the letter string associated with the utterance. Also, for example, the evaluation unit 212 calculates an evaluation value associated with the expressive ability in accordance with the amount of vocabularies included in the letter string associated with the utterance and a relationship between the content of the utterance and the emotion information. Also, for example, the evaluation unit 212 calculates an evaluation value associated with the expressive ability in accordance with the amount of vocabularies included in the letter string associated with the utterance and the emotion information.

Also, the evaluation unit 212 identifies the utterance that has triggered the activation of the exchange of opinions in the group, and uses it for the evaluation of the identified learner S. Specifically, the evaluation unit 212 identifies an amount of change in the utterance quantity and an amount of change in each emotion component in the group and identifies the letter string and the learner S associated with the utterance immediately before the timing when the amount of change exceeds a predetermined value. For example, the evaluation unit 212 may evaluate that the learner S associated with the utterance immediately before the timing when the amount of change in the utterance quantity exceeds the predetermined value has contributed to the activation of the exchange of opinions and increase the evaluation value of the learner S. Also, for example, the evaluation unit 212 may evaluate that the learner S associated with the utterance immediately before the timing when the amount of change in the emotion component associated with joy exceeds a predetermined value in the group has contributed to the fostering of a sense of unity and increase the evaluation value of the learner S.

The output unit 211 outputs an evaluation result for each learner S from the evaluation unit 212 to the coach terminal 300. The coach terminal 300 displays the evaluation result for each learner S received from the learning support device 200.

The coach terminal 300 displays, for example, a score for each evaluation item in the rubric as the evaluation result. Also, the coach terminal 300 displays a matter of special note such as the fact that "the exchange of opinions in the group has been activated according to the speech 'oooo'."

As described above, the learning support device 200 according to the second example embodiment generates evaluation information representing the evaluation for each learner S on the basis of the plurality of letter strings and the plurality of pieces of emotion information. Thereby, the coach T can evaluate the plurality of learners S with reference to the displayed evaluation results. Also, the learning support device 200 identifies an utterance that has triggered the change in the utterance in the group on the basis of the plurality of letter strings and the plurality of pieces of emotion information, and uses it for the evaluation of the learner associated with the utterance (for example, increases the evaluation value of the learner by a predetermined value). Thereby, the coach T can appropriately evaluate the learner S who has made an accurate utterance.

Third Example Embodiment

A learning support system 1 according to a third example embodiment comprehensively analyzes information such as academic ability test results, learning logs in a learning tablet terminal, questionnaire surveys, and external social learning content in addition to collaborative learning data and provides recommendation information to a coach T, a learner S, and a guardian of the learner S.

Figure 9:
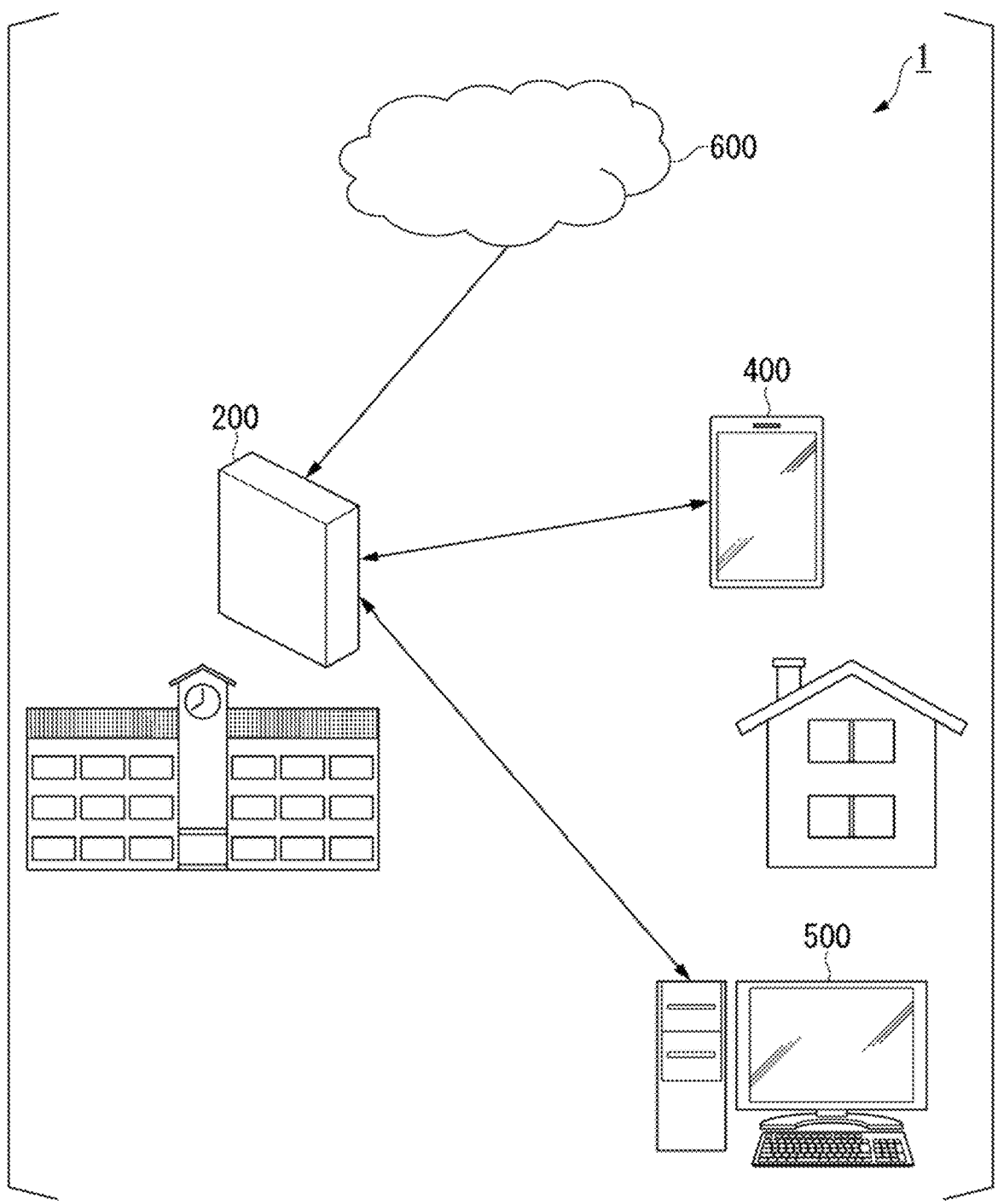
FIG. 9 is a diagram showing a configuration of a learning support system according to a third example embodiment.

FIG. 9 is a diagram showing a configuration of the learning support system 1 according to the third example embodiment.

A learning support device 200 according to the third example embodiment collects information from a learning tablet terminal 400 owned by the learner S or lent to the learner S, a home terminal 500 browsed by the guardian of the learner S, and an external learning content server 600. Also, the learning support device 200 provides recommendation information to the learning tablet terminal 400 and the home terminal 500.

The learning tablet terminal 400 displays learning content designated by the coach T or actively selected by the learner S. The learning tablet terminal 400 transmits a history of operations on the learning content by the learner S to the learning support device 200 as learning log data. For example, when the learning content is a sentence, the learning tablet terminal 400 records a letter string marked by the learner S as the learning log data. Also, for example, when the learning content is a workbook, the learning tablet terminal 400 records the correctness of an answer by the learner S as the learning log data. Here, a user ID of the learner S to use is recorded in the learning tablet terminal 400 in advance and the user ID is associated with the learning log data transmitted to the learning support device 200.

The learning content server 600 distributes social study content. Specific examples of the social learning content may include employment placement content, news content, and the like. It is expected that the learner S will have social interest by coming into contact with the social learning content. The learning content server 600 transmits, for example, the social learning content browsed by the learner S to the learning support device 200 as the learning log data. The learner S logs in to the learning content server 600 using, for example, a user ID of the learner S and the user ID is associated with the learning log data transmitted to the learning support device 200.

Figure 10:
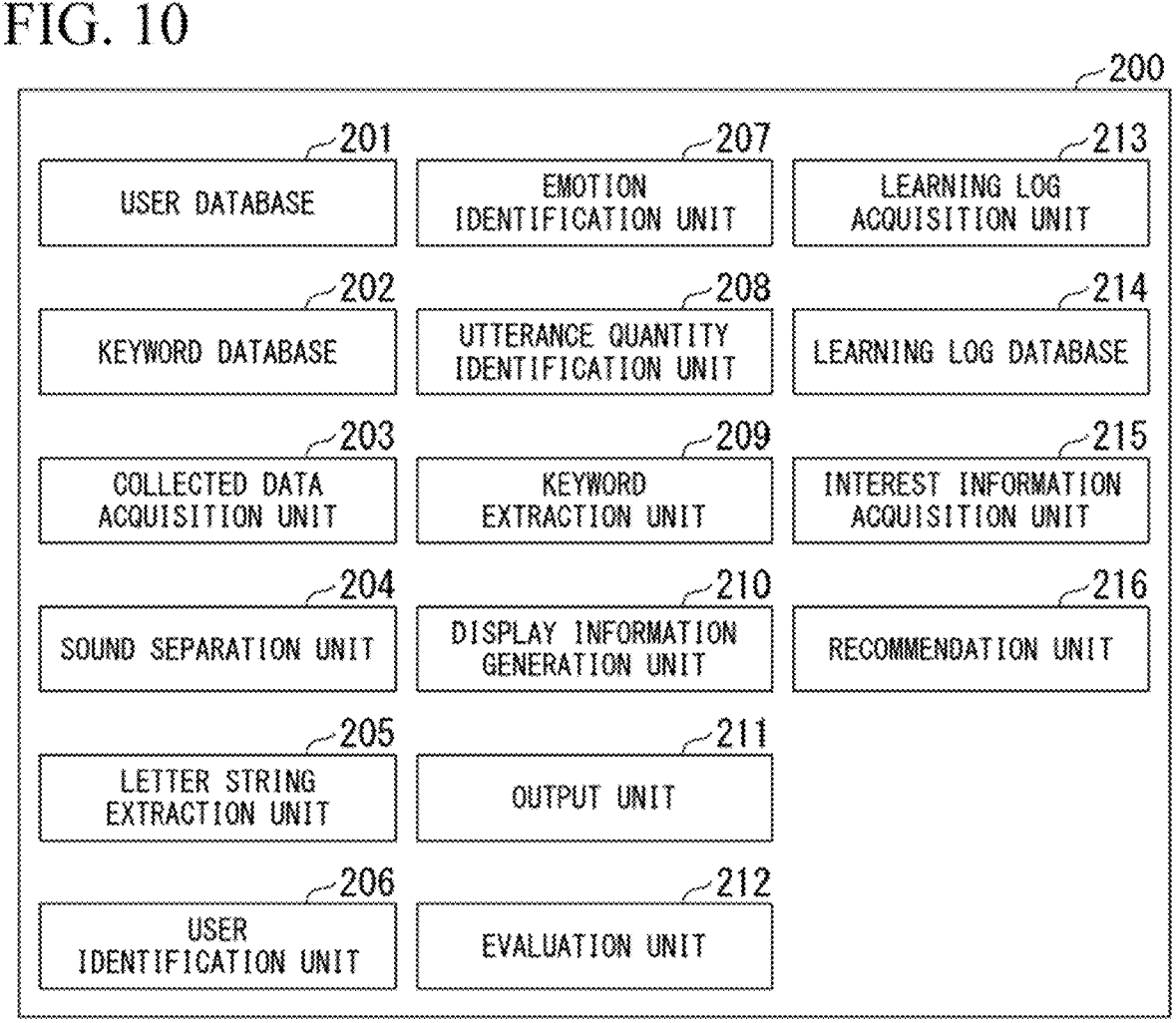
FIG. 10 is a schematic block diagram showing a configuration of a learning support device according to the third example embodiment.

FIG. 10 is a schematic block diagram showing a configuration of the learning support device 200 according to the third example embodiment.

In addition to the configuration of the second example embodiment, the learning support device 200 according to the third example embodiment further includes a learning log acquisition unit (a learning log acquisition means) 213, a learning log database 214, an interest information acquisition unit (an interest information acquisition means) 215, and a recommendation unit (a recommendation means) 216. An operation of the evaluation unit 212 according to the third example embodiment is different from that of the second example embodiment.

The learning log acquisition unit 213 receives learning log data from the learning tablet terminal 400, the home terminal 500, and the learning content server 600. The learning log acquisition unit 213 generates a keyword used for collaborative learning from the learning log data and records the keyword in the keyword database 202 in association with the user ID. For example, the learning log acquisition unit 213 records a letter string of the learning content with a marker and a keyword associated with the browsed social learning content within the learning log data, in the keyword database 202. Also, the learning log data is recorded in the learning log database 214 in association with the user ID.

The evaluation unit 212 further performs evaluation associated with the utilization of learned knowledge in addition to the evaluation based on the evaluation items in the rubric and the utterance that has triggered the activation of the exchange of opinions in the group. Specifically, the evaluation unit 212 determines whether or not a keyword stored in the keyword database 202 in association with the user ID of the learner S, i.e., a keyword generated on the basis of the learning log data, is included in a letter string extracted by the letter string extraction unit 205. The evaluation unit 212 records an evaluation result as learning log data in the learning log database 214.

The evaluation result of the evaluation unit 212 is output to the home terminal 500 as well as the coach terminal 300. Thereby, the guardian of the learner S can not only recognize the evaluation of the learner S in the collaborative learning, but also recognize how the learner S utilizes, in the collaborative learning, the knowledge learned actively. That is, the guardian of the learner S can recognize the learning state of the learner S and can appropriately evaluate the learner S.

The interest information acquisition unit 215 analyzes the learning log data stored in the learning log database 214 and estimates a target of the social interest of the learner S. For example, the recommendation unit 216 estimates the target of the social interest of each learner S on the basis of a usage history of social learning content and an attitude of participation in project based learning (PBL) within the learning log data. The target of the social interest is an example of interest information. Here, in another example embodiment, the interest information acquisition unit 215 may estimate the hobbies and preferences of the learner S in place of or in addition to the target of the social interest. Also, in another example embodiment, the interest information acquisition unit 215 may directly acquire the interest information through an input of the learner S or the like.

The recommendation unit 216 analyzes the learning log data stored in the learning log database 214 and estimates a learning state of the learner S for each subject. For example, the recommendation unit 216 estimates a subject-specific learning state of each learner S on the basis of the answer to the workbook or the achievement test and a result of evaluation of the collaborative learning by the evaluation unit 212 within the learning log data.

The recommendation unit 216 generates recommendation information for recommending learning content for each learner S on the basis of the learning state of the learner S and the target of the social interest. For example, the recommendation unit 216 recommends learning content for which the learner S has high social interest from among a plurality of pieces of learning content that can be used to raise a level of learning, on the basis of the learning state. Also, for example, the recommendation unit 216 identifies a learning item necessary for deepening the understanding of the target of the social interest of the learner S on the basis of the target of the social interest, compares the identified learning item with a learning state, and recommends the learning content that can be used for the learning of an insufficient learning item.

As described above, the learning support device 200 according to the third example embodiment acquires the learning log data for each of the plurality of learners S and generates the evaluation information of each learner S on the basis of the learning log data and a plurality of letter strings that have been extracted. Thereby, the learning support device 200 can evaluate whether or not the knowledge learned by the learner S can be appropriately utilized.

Also, the learning support device 200 according to the third example embodiment acquires interest information of a plurality of learners S and generates recommendation information associated with learning of each of the plurality of learners S on the basis of the interest information and the evaluation information. Thereby, the learning support device 200 can appropriately make recommendations regarding learning in accordance with the interest of the learner S.

Although a plurality of example embodiments have been described in detail with reference to the drawings, the specific configuration is not limited to the above and various design changes and the like can be made.

For example, although the learning support device 200 according to the above-described example embodiment is configured as a device independent of the coach terminal 300, the configuration of the learning support device 200 is not limited thereto. For example, in other example embodiments, the learning support device 200 may be mounted in the coach terminal 300.

Although the learning support device 200 according to the above-described example embodiment is used for learning support of collaborative learning, the use of the learning support device 200 is not limited thereto. For example, in another example embodiment, the learning support device 200 may generate display information on the basis of the utterances associated with the questions and the answers of the learner S in the normal lesson and the coach T may use the display information in the evaluation of the lesson attitude of the learner S and the like.

Basic Configuration

Figure 11:
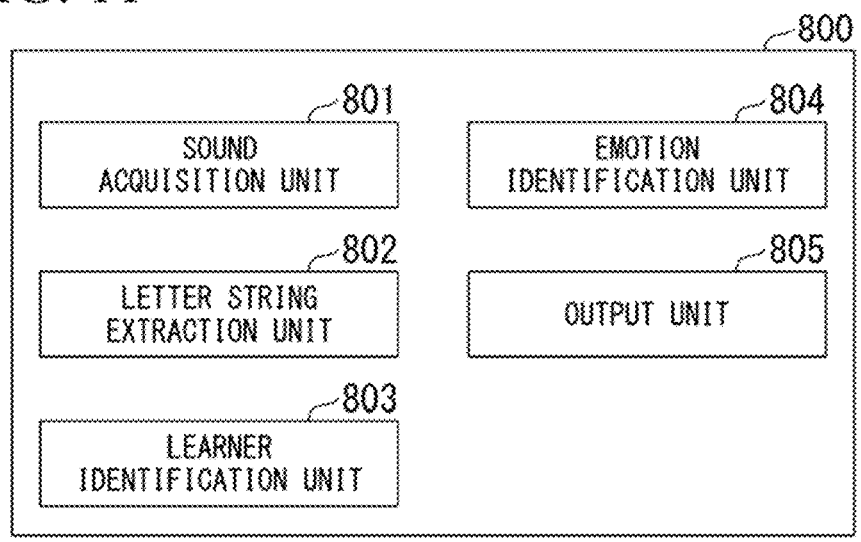
FIG. 11 is a schematic block diagram showing a basic configuration of the learning support device.

FIG. 11 is a schematic block diagram showing a basic configuration of the learning support device.

Although the configurations shown in FIGS. 2, 8 and 10 have been described as various example embodiments of the learning support device in the above-described example embodiment, the basic configuration of the learning support device is as shown in FIG. 11.

That is, the learning support device 800 has a sound acquisition unit 801, a letter string extraction unit 802, a learner identification unit 803, an emotion identification unit 804, and an output unit 805 as the basic configuration.

The sound acquisition unit 801 acquires sound data. The sound acquisition unit 801 corresponds to the collected data acquisition unit 203.

The letter string extraction unit 802 extracts a letter string representing the utterance content for each utterance by the learner included in the sound data. The letter string extraction unit 802 corresponds to the letter string extraction unit 205.

The learner identification unit 803 identifies a learner who has made the utterance from among a plurality of learners for each utterance on the basis of the sound data. The learner identification unit 803 corresponds to the user identification unit 206.

The emotion identification unit 804 identifies emotion information representing the learner's emotion in the utterance on the basis of at least one of the sound data and the data of a moving image captured together with the sound data. The emotion identification unit 804 corresponds to the emotion identification unit 207.

The output unit 805 arranges a plurality of pieces of emotion information in time-series order with being associated with a plurality of letter strings for each group to which the learner belongs and outputs them. The output unit 805 corresponds to the output unit 211.

Thereby, the learning support device 800 allows the coach to evaluate the learner or the learner's utterance in view of the activity of exchanging opinions.

Computer Configuration

Figure 12:
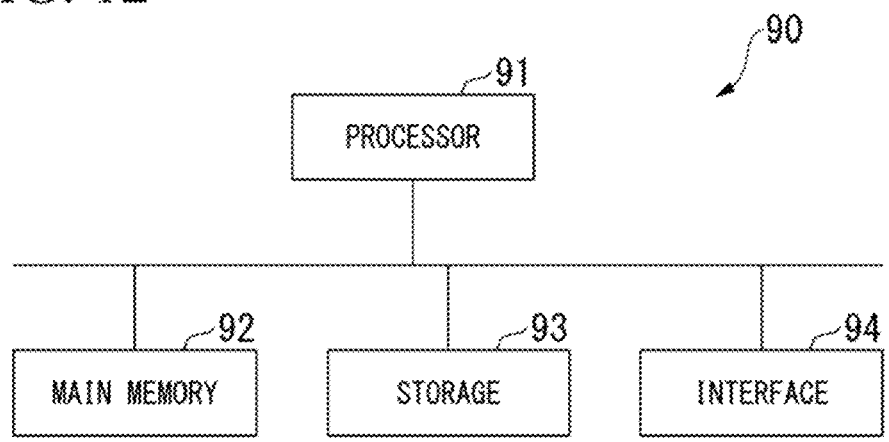
FIG. 12 is a schematic block diagram showing a configuration of a computer according to at least one example embodiment.

FIG. 12 is a schematic block diagram showing a configuration of a computer 90 according to at least one example embodiment.

The computer 90 includes a processor 91, a main memory 92, a storage 93, and an interface 94.

The learning support device 200 and the learning support device 800 described above are mounted in the computer 90. An operation of each processing unit described above is stored in the storage 93 in the form of a program. The processor 91 reads a program from the storage 93, expands the program into the main memory 92, and executes the above process in accordance with the program. Also, the processor 91 secures a storage area corresponding to each of the above-described storage units in the main memory 92 or the storage 93 in accordance with the program.

The program may be a program for implementing some of the functions exerted on the computer 90. For example, the program may exert its function in combination with another program already stored in the storage 93 or in combination with another program mounted in another device. In another example embodiment, the computer 90 may include a custom large scale integrated circuit (LSI) such as a programmable logic device (PLD) in addition to or in place of the above configuration. Examples of the PLD include a programmable array logic (PAL), a generic array logic (GAL), a complex programmable logic device (CPLD), and a field programmable gate array (FPGA). In this case, some or all of the functions implemented by the processor may be implemented by the integrated circuit.

Examples of the storage 93 include a hard disk drive (HDD), a solid state drive (SSD), a magnetic disc, an optical magnetic disc, a compact disc read only memory (CD-ROM), a digital versatile disc read only memory (DVD-ROM), a semiconductor memory, and the like. The storage 93 may be internal media directly connected to a bus of the computer 90 or external media connected to the computer 90 via the interface 94 or a communication circuit. When the program is distributed to the computer 90 via a communication circuit, the distributed computer 90 may develop the program into the main memory 92 and execute the above process. In at least one example embodiment, the storage 93 is a non-transitory tangible storage medium.

Also, the program may be a program for implementing some of the above-mentioned functions. Furthermore, the program may be a so-called differential file (differential program) for implementing the above-described function in combination with another program already stored in the storage 93.

This application is based upon and claims the benefit of priority from Japanese patent application No. 2018-227694, filed Dec. 4, 2018, the disclosure of which is incorporated herein in its entirety by reference.

INDUSTRIAL APPLICABILITY

The present invention may be applied to a learning support device, a learning support method, and a recording medium.

REFERENCE SIGN

1 Learning support system
100 Collection device
200 Learning support device
201 User database
202 Keyword database
203 Collected data acquisition unit
204 Sound separation unit
205 Letter string extraction unit
206 User identification unit 207 Emotion identification unit
208 Utterance quantity identification unit
209 Keyword extraction unit
210 Display information generation unit
211 Output unit
212 Evaluation unit
213 Learning log acquisition unit
214 Learning log database
215 Interest information acquisition unit
216 Recommendation unit
300 Coach terminal
400 Learning tablet terminal
500 Home terminal
600 Learning content server
S Learner
T Coach

What is claimed is:

1. A learning support device comprising:
at least one memory configured to store instructions; and
at least one processor configured to execute the instructions to:
acquire sound data of a plurality of utterances made by a plurality of learners organized over a plurality of groups;
for each utterance in the sound data, extract a letter string representing content of the utterance;
for each utterance in the sound data, identify the learned who has made the utterance;
for each utterance in the sound data, identify an emotion of the learner when making the utterance, based on at least one of the sound data and data of a moving image captured together with the sound data,
wherein in a case in which the emotion is identified based on the sound data, the emotion is identified by using a first learned model created by machine learning using utterance sound data in which emotion information representing emotions of users who have made the emotions is known, and
wherein in a case in which the emotion is identified based on the data of the moving image captured together with the data sounds, the emotion is identified by using a second learned model created by machine learning using moving image data in which the emotion information representing the emotions of the users who have made the emotions is known;
generate evaluation information representing evaluation for each learner based on the letter string and the emotion information;
for each group, output on a display:
the utterances made by the learners in the group to which the column corresponds, the utterances organized in time-series order;
for each utterance, indicate the emotion of the learner when making the utterance; and
for each utterance, a name of the learner that made the utterance, adjacent to the utterance; and
output, on the display, the evaluation information,
wherein generation of the evaluation information includes identifying an utterance that has triggered a change in utterance in a group based on the letter string and the emotion information and using the identified utterance for generation of evaluation information of a learner associated with the identified utterance, and
wherein the utterance that has triggered the change is identified by:
identifying an amount of change in an utterance quantity and in the emotion identified for each utterance, based on the letter string extracted for each utterance and the emotion information; and
identifying, as the utterance that has triggered the change, an utterance immediately before a time when the amount of change exceeds a predetermined value.

2. The learning support device according to claim 1, wherein the at least one processor is configured to execute the instructions to further output display information in which, for each group, each utterance including the letter string extracted therefrom and the emotion information is arranged in time series order.

3. The learning support device according to claim 1, wherein the at least one processor is configured to execute the instructions to:
identify a time series of the utterance quantity of each of the plurality of learners or the plurality of groups based on the letter strings extracted for each utterance in the sound data; and
output, for each group, display information representing a change over time in the utterance quantity and the emotion information associated with the letter string extracted for each utterance in the sound data.

4. The learning support device according to claim 3, wherein the at least one processor is configured to execute the instructions to:
identify an utterance by a coach among the utterances based on the sound data,
wherein the display information that is output includes information representing a timing of the utterance by the coach.

5. The learning support device according to claim 1, wherein the at least one processor is configured to execute the instructions to:
acquire learning log data for each of the plurality of learners,
wherein generating the evaluation information includes generating the evaluation information based on the learning log data and the letter string extracted for each utterance.

6. The learning support device according to claim 1, wherein the at least one processor is configured to execute the instructions to:
acquire interest information about an interest of the plurality of learners; and
generate recommendation information about learning of each of the plurality of learners based on the interest information and the evaluation information.

7. A learning support method performed by a computer and comprising:
acquiring sound data of a plurality of utterances made by a plurality of learners organized over a plurality of groups;
for each utterance in the sound data, extracting a letter string representing content of the utterance;
for each utterance in the sound data, identifying the learner who has made the utterance;
for each utterance in the sound data, identifying an emotion of the learner when making the utterance, based on at least one of the sound data and data of a moving image captured together with the sound data,
wherein in a case in which the emotion is identified based on the sound data, the emotion is identified by using a first learned model created by machine learning using utterance sound data in which emotion information representing emotions of users who have made the emotions is known, and wherein in a case in which the emotion is identified based on the data of the moving image captured together with the data sounds, the emotion is identified by using a second learned model created by machine learning using moving image data in which the emotion information representing the emotions of the users who have made the emotions is known;

generating evaluation information representing evaluation for each learner based on the letter string and the emotion information;

for each group, outputting on a display:
  the utterances made by the learners in the group to which the column corresponds, the utterances organized in time-series order;
  for each utterance, indicate the emotion of the learner when making the utterance; and
  for each utterance, a name of the learner that made the utterance, adjacent to the utterance; and outputting, on the display, the evaluation information, wherein generating the evaluation information comprises identifying an utterance that has triggered a change in an utterance in a group based on the letter string and the emotion information and using the identified utterance for generation of evaluation information of a learner associated with the identified utterance, and wherein the utterance that has triggered the change is identified by:
  identifying an amount of change in an utterance quantity and in the emotion identified for each utterance, based on the letter string extracted for each utterance and the emotion information; and
  identifying, as the utterance that has triggered the change, an utterance immediately before a time when the amount of change exceeds a predetermined value.

8. A non-transitory recording medium storing a program for causing a computer to execute:

acquiring sound data of a plurality of utterances made by a plurality of learners organized over a plurality of groups;

for each utterance in the sound data, extracting a letter string representing content of the utterance;

for each utterance in the sound data, identifying the learner who has made the utterance;

for each utterance in the sound data, identifying an emotion of the learner when making the utterance, based on at least one of the sound data and data of a moving image captured together with the sound data, wherein in a case in which the emotion is identified based on the sound data, the emotion is identified by using a first learned model created by machine learning using utterance sound data in which emotion information representing emotions of users who have made the emotions is known, and wherein in a case in which the emotion is identified based on the data of the moving image captured together with the data sounds, the emotion is identified by using a second learned model created by machine learning using moving image data in which the emotion information representing the emotions of the users who have made the emotions is known;

generating evaluation information representing evaluation for each learner based on the letter string and the emotion information;

for each group, outputting on a display:
  the utterances made by the learners in the group to which the column corresponds, the utterances organized in time-series order;
  for each utterance, indicate the emotion of the learner when making the utterance; and
  for each utterance, a name of the learner that made the utterance, adjacent to the utterance; and outputting, on the display, the evaluation information, wherein generating the evaluation information comprises identifying an utterance that has triggered a change in an utterance in a group based on the letter string and the emotion information and using the identified utterance for generation of evaluation information of a learner associated with the identified utterance, and wherein the utterance that has triggered the change is identified by:
  identifying an amount of change in an utterance quantity and in the emotion identified for each utterance, based on the letter string extracted for each utterance and the emotion information; and
  identifying, as the utterance that has triggered the change, an utterance immediately before a time when the amount of change exceeds a predetermined value.

* * * * *